United States Patent [19]
Middleton et al.

[11] 4,241,808
[45] Dec. 30, 1980

[54] PORTABLE AND COLLAPSIBLE A-FRAME PROP TYPE SCAFFOLD

[76] Inventors: Donald E. Middleton, 4701 N. Napa, Spokane, Wash. 99207; DeVere J. Audette, deceased, late of 1517 Nelson, Spokane, Wash. 99207, by Marguerite Audette, executrix

[21] Appl. No.: 70,358

[22] Filed: Aug. 28, 1979

[51] Int. Cl.[3] .............................................. F16M 11/00
[52] U.S. Cl. ..................................... 182/155; 182/181; 182/225
[58] Field of Search ................................ 182/181-186, 182/224-227, 153, 152, 82, 230, 155; 248/235, 240

[56] References Cited

U.S. PATENT DOCUMENTS

| | | | |
|---|---|---|---|
| 1,576,583 | 3/1926 | England | 182/183 |
| 1,880,909 | 10/1932 | Dunlap | 182/181 |
| 2,272,957 | 2/1942 | Walp | 182/224 |
| 2,966,957 | 1/1961 | Ireland | 182/224 |
| 3,040,834 | 6/1962 | Dakin | 182/186 |
| 3,098,540 | 7/1963 | Hiner | 182/152 |
| 3,388,771 | 6/1968 | Corneliusen | 182/184 |
| 4,004,652 | 1/1977 | Alvarado | 182/152 |

*Primary Examiner*—Reinaldo P. Machado
*Attorney, Agent, or Firm*—W. Britton Moore

[57] ABSTRACT

A portable and collapsible A-frame prop type scaffold including pairs of spaced apart L-shaped metal angle A-frame supporting legs pivotally connected at their upper points of juncture and having scaffold plank supporting angle brackets pivoted to the upper ends thereof and extendable at right angles thereto, with foldable and interconnectable bars spanning and pivoted to and spreading the legs apart, and locking support angle braces pivoted to the outer ends of the supporting angle brackets and extending angularly downwardly therefrom, with transverse angle bars on the lower ends thereof engageable with the foldable bars. Flat locking straps arranged beneath the locking support angle braces with upwardly and outwardly curved outer ends insertable within slots in the lower ends of the angle braces so as to be pivoted thereto and be extendable rearwardly beneath and in engagement with the abutting foldable bars and transverse angle brackets, with the inner ends of the locking straps being secured to the angle braces by slidable encircling locking rings thereon for readily and securely clamping and locking the angle braces to the foldable bars and legs.

7 Claims, 6 Drawing Figures

PORTABLE AND COLLAPSIBLE A-FRAME PROP TYPE SCAFFOLD

This invention relates to a portable and collapsible A-frame prop type scaffold.

While various prop type scaffolds embodying A-frame legs have heretofore been proposed, such as those represented by U.S. Pat. Nos. to Walp 2,272,957, Hiner 3,098,540, Corneliusen 3,388,771, and Alvarado 4,004,652, these devices have not been satisfactory because of the difficulties encountered in setting them up and dismantling, and more importantly the absence therein of easily operable locking means for securely retaining the component parts in assembled position so that danger of collapsing is eliminated or materially reduced.

Accordingly, the principal object of the present invention is to provide an A-frame prop type scaffold constructed of metal angle bars with the pairs of A-frame supporting legs having scaffold plank supporting brackets, connectable spanning bracing bars, and angular locking angle brackets, with foldable transverse bars associated and interconnected therewith, and wherein flat locking straps arranged beneath the locking angle braces have upwardly curved ends insertable through slots in the ends of the braces so that the straps project rearwardly therebeneath and are connected thereto by encircling locking rings for readily and securely clamping and locking the angle braces to the foldable bars and legs.

Another object is the provision of an A-frame type scaffold including pairs of A-frame legs which, when assembled and set up, may be alternatively arranged with a pair of A-frame leg units arranged spaced apart and parallel to a wall surface with the uppermost plank supporting brackets extending thereagainst with scaffold planks spanning the supporting bars, or wherein two pairs of legs may be arranged in spaced apart parallel and alined relationship with the inner ends of the plank supporting brackets in each pair of legs abutting and being interconnected whereby scaffold planks may span each alined pair of supporting brackets.

Still another object is to provide a lightweight A-frame scaffold leg construction wherein the component units thereof are pivotally and collapsibly interconnected for ready setting up and disassembly for storage and transportation, and having separable locking straps pivotally interconnected to the supporting braces for securely and readily locking these braces to the A-frame legs.

A further object is the provision of an A-frame scaffold leg construction wherein the angular locking support brace of each leg unit is formed from an angle bar with the top wall being flat and slotted at its lower end and a transverse angle bar is arranged adjacent to the slot so that, when the angle bar abuts the folding bars on the legs, the curved outer end of a flat locking strap arranged beneath the support brace is insertable within the slot thereof to enable pivotal movement of the strap relative thereto and clamping of the angle bar and folding leg bars therebetween, with the flat locking strap being retained in locking clamped position by a slidable locking ring encircling the brace and bar.

Other objects and advantages will be apparent as the specification is considered with the accompanying drawings wherein FIG. 1 is a perspective view of an arrangement wherein a pair of A-frame scaffold supporting legs are propped against a wall with a scaffold plank spanning the angle bar brackets thereof;

Figure 6:
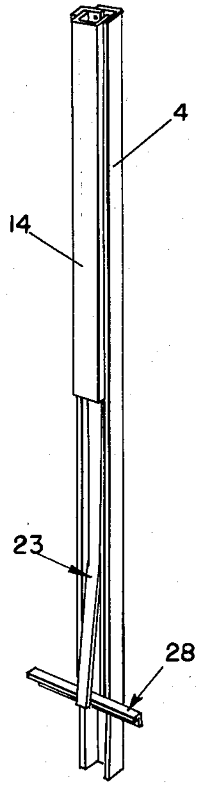
Figure 5:
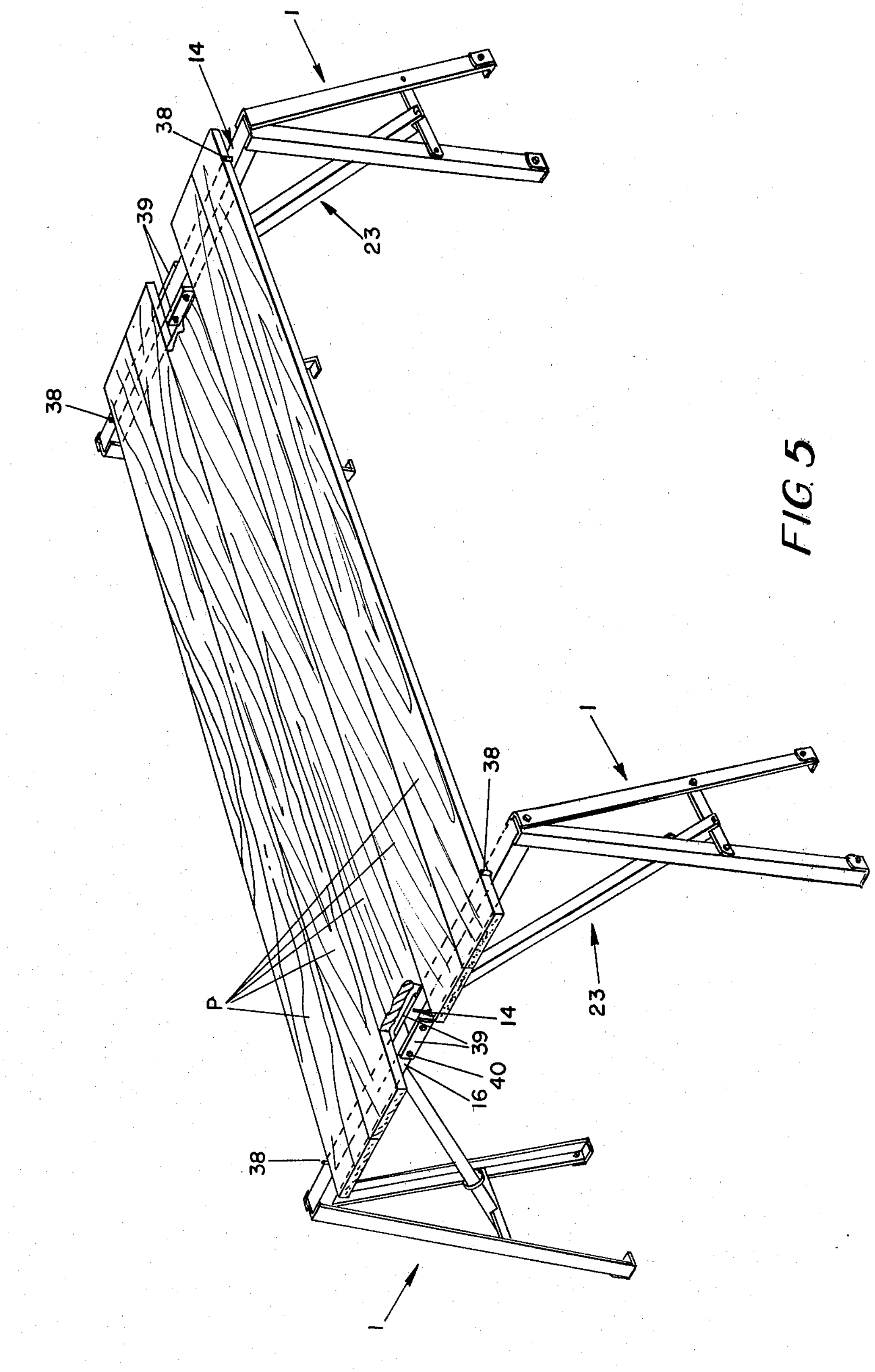

FIG. 5 is a perspective view of an alternative arrangement wherein two pairs of A-frame scaffold supporting legs are utilized, in spaced apart parallel and alined relationship, with the inner ends of the plank supporting brackets in each pair of legs abutting and being interconnected to thereby support scaffold planks spanning the brackets of each pair of legs; and FIG. 6 is a perspective view of a leg unit fully collapsed for handling and storage.

Figure 1:
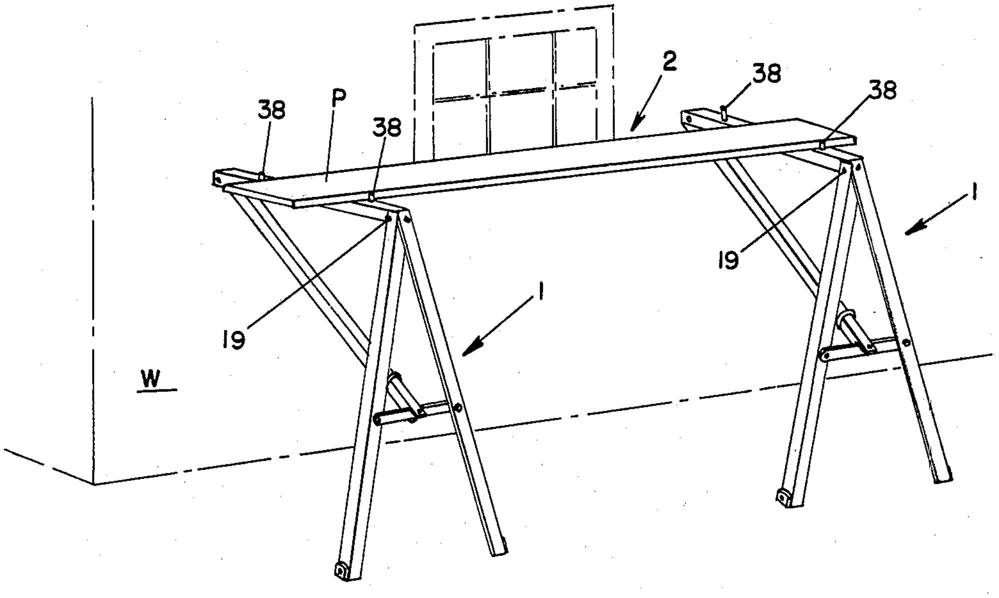
Figure 2:
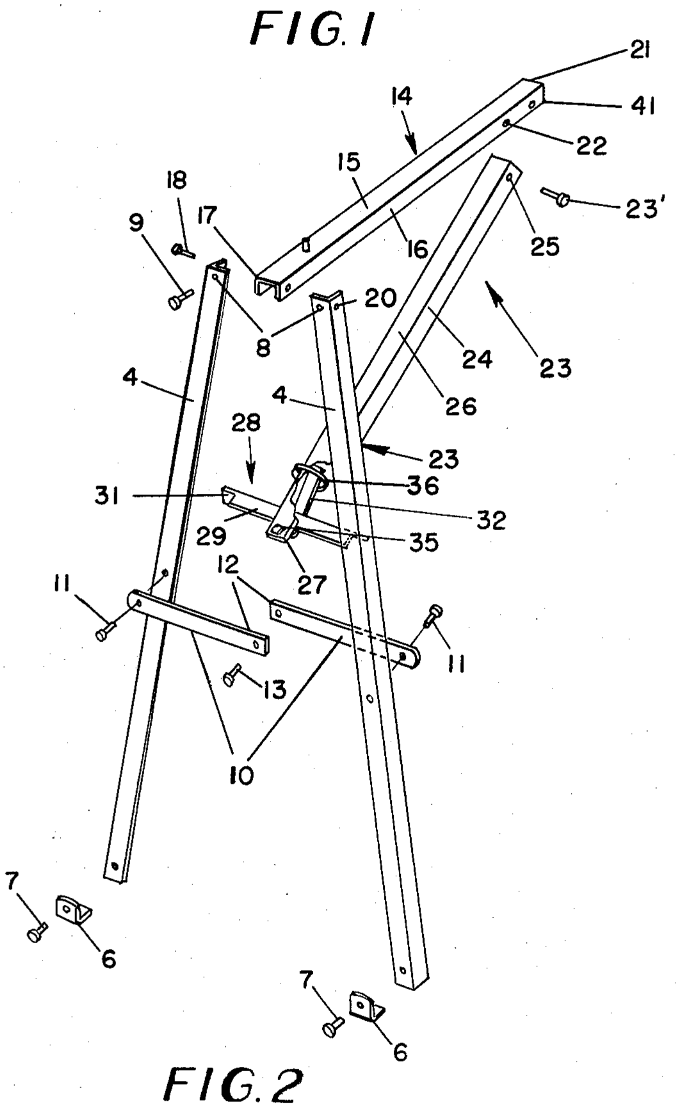
FIG. 2 is a exploded view of the component units constituting each pair of A-frame supporting legs.
Figure 3:
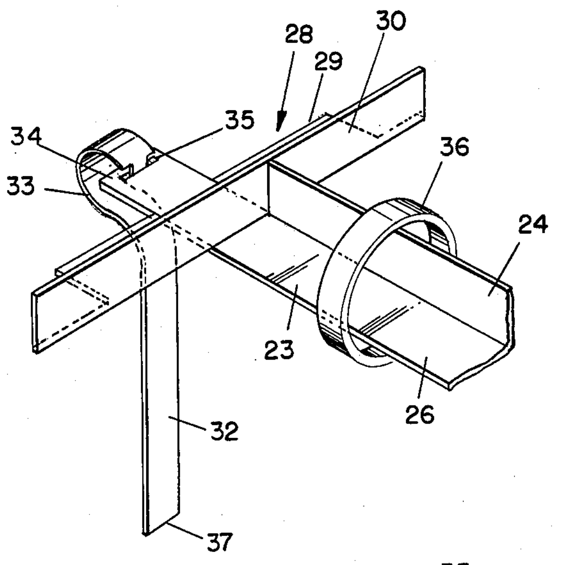
FIG. 3 is a perspective view of the lower end portion of a locking support brace with a transverse angle bar thereon, and the curved end of a flat locking strap pivotally insertable through a slot in the brace and clampable against the underside thereof by a ring encircling and slidable thereover (this view is inverted or upside down in the interest of clarity)

Referring more particularly to the drawings, wherein similar reference characters designate like parts throughout the several views, each A-frame supporting leg unit 1 forming a scaffold 2 hereof includes two elongated L-shaped metal angle bars 3 having a horizontal flat front wall 4 and a vertical flat side wall 5 at right angles thereto. The bars 3 are provided with suitable feet 6 swivally connected to the lower ends thereof, as at 7. The upper ends of the bars 3 converge and the horizontal front surfaces 4 interfit and are apertured, as at 8, at the point of juncture therebetween, to receive a suitable pivot pin 9, as best shown in FIG. 1. Intermediate the ends of leg bars 3 and pivotally connected, as at 11, to the front face of a front wall 4 on one leg and to the rear face of a front wall on the other leg are a pair of spanning and bracing bars 10 which overlap and are suitably removably interconnected at the overlapped inner ends 12 by suitable pins or the like 13.

Interfitting between the flat vertical side walls 5 of leg bars 3 at their intersection is the inner end 17 of an inverted L-shaped horizontally disposed plank support bracket 14 having a horizontal flat upper wall 15 and a vertical flat side wall 16, which end 17 is removably interconnected by a suitable pin 18 projecting through alined openings 19 and 20 in side leg walls 5 and side bracket wall 16. The support bracket 14 projects horizontally at right angles to the leg bars 3, and the outer end 21 thereof has an aperture 22 in side wall 16 which is alinable with an aperture 25 in a vertical flat side wall 24 of an inverted L-shaped downwardly, forwardly and angularly extending angle brace 23 having a horizontal flat upper wall 26. A suitable pivot pin 23' is inserted through openings 22-25 and pivotally connects bracket 14 and brace 23. The lower end of angle brace side wall 24 is notched, as at 27, to accommodate an inverted L-shaped transversely extending angle bar 28, with its flat upper wall 29 and vertical rear wall 30 being welded or otherwise suitably attached to the underside of wall 26 and the lower end of side wall 24 of the angle bar 28. The ends of the flat upper wall 29 of angle bar 28 are notched, as at 31, to flushly abut the rear face of front wall 4 of leg angle bars 3, and thereby enable the front face of the vertical rear wall 30 to abut the innermost of the two overlapping leg bracing bars 10, as best shown in FIG. 4.

Figure 4:
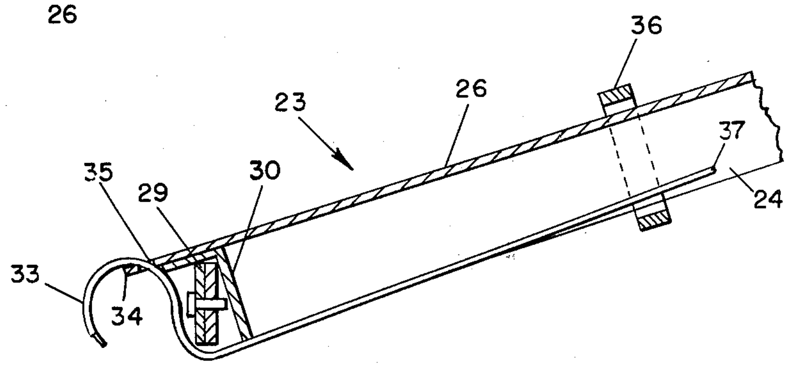
FIG. 4 is a section through the lower end portion of the locking support brace, showing the locking strap in clamped locked position relative to the transverse angle bar, folding leg bars, and brace.

Referring to FIG. 4, with the overlapping leg bracing bars 10 interconnected and the transverse angle bar 28 on angle brace 23 interfitting therebehind, the lower end of the flat upper wall 29 of the brace will project over and beyond the bracing bars 10 and the underside thereof will flatly engage and be supported by the upper edges thereof. A flat elongated metal strap 32 is arranged underneath the lower end of angle brace 23 and is bent upwardly and downwardly in a curve, as at 33, so that its outer end 34 projects upwardly through a slot 35 in the terminal end of the upper brace wall 24 and is thus removably but pivotally connected thereto. Thus, with the brace 23 and its transverse angle bar 28 overlapping the bracing bars 10, the strap 32 may be swung rearwardly and upwardly into a position parallel to angle brace 23 and a flat metal retaining ring 36, encircling and slidably arranged on brace 23, may be slid downwardly thereover and the free upper end 37 of strap 32 and thereby retain the latter thereat so that the leg bracing bars 10 are snugly and securely clamped and locked between the transverse angle bar 28 and the strap. The locking strap 32 and associated ring 36 also retain the angle brace 23 and support bracket 14 in position relative to the legs of each unit.

From the foregoing, it will be understood that, when assembled and so set up, a pair of spaced leg units may be arranged parallel to and spaced from a building wall W with the horizontally disposed angle brackets 8 thereof projecting towards and contacting the wall surface so that the two brackets will be spaced apart in parallel relation at right angles thereto. Spanning supporting planks P may then be laid thereon and thereacross so as to be supported thereby, with upstanding pins 38 adjacent the ends of the flat upper walls 9 thereof serving to retain the planks thereon.

In the arrangement of FIG. 5, where a self standing scaffold is required, the leg units are arranged in two spaced pairs, with the units in each pair being oppositely positioned so that the horizontally disposed angle brackets 14 of each are alined and the inner ends abut. A flat bridging strap 39 with spaced suitable pins or plugs 40 projecting from one side thereof may be longitudinally positioned over the juncture between the ends of the brackets and the pins 40 are removably inserted in apertures 41 provided in the vertical side walls 16 of the brackets. Thus, each of the two leg units are retained in this assembled arrangement and the planks may be laid thereacross, in an obvious manner.

When dismantling and storage of the leg units is required, the planks are, of course, first removed, as are the bridging straps 39 in the embodiment of FIG. 5. The retaining rings 36 may be slid upwardly along angle brace 23 to free the end of strap 32, which is then swung downwardly and forwardly from clamping engagement with the underside edges of leg bracing bars 10. This enables the angle brace 23 with its transverse angle bar 28 to be lifted therefrom, whereupon the bracing bars 10 may be disconnected and the legs collapsed inwardly into parallel engagement, which permits of the support bracket 14 and angle brace 23 being swung downwardly and forwardly about pivots 18 and 23' into engagement with the collapsed legs to effect a very compact and easily handled unit, as shown in FIG. 6.

While a preferred embodiment has been shown and described, it is to be understood that various changes and improvements may be made therein without departing from the scope and spirit of the appended claims.

What we claim is:

1. In a portable and collapsible A-frame scaffold including at least two A-frame leg units with horizontally disposed scaffold planks extending therebetween and being supported thereby, wherein each of said leg units is formed from L-shaped metal bars pivotally interconnected at their upper ends and diverging downwardly to form A-frame leg units, spanning bracing bars pivoted to said legs intermediate their ends and being removably interconnected, pivotally connected to the upper ends of each leg unit is a horizontally extending elongated plank supporting angle bar bracket, pivotally connected to the outer end of each of said brackets is a downwardly and angularly extending angle bar brace, a transverse angle bar formed on the lower end of each brace is engageable with said spanning leg bracing bars with the lower end of said brace projecting thereover, flat elongated strap means arranged on the underside of said brace at said lower end and being pivoted to the projected lower end of said brace so as to extend under said spanning leg bracing bars and said transverse angle bar, retaining ring means on said brace and engageable with said strap means for securing said strap means against said brace and clamping and locking said leg bracing bars and transverse angle bar together and thereby preventing collapsing of each of said A-frame leg units.

2. In a scaffold device according to claim 1, wherein the projected lower end of said angle brace is slotted and the lower end of said strap means projects through said slotted end and is pivoted thereto.

3. In a scaffold device according to claim 2, wherein the lower end of said strap means is upwardly and downwardly curved and projects through said slotted end.

4. In a scaffold device according to claim 3, wherein said retaining ring means encircles said angle brace and said strap means.

5. In a scaffold device according to claim 4, wherein said retaining ring means encircles and is slidably arranged on said angle brace and is movable into encircling engagement with said strap means for clamping the latter to the underside of said brace.

6. In a scaffold device according to claim 1, wherein two A-frame leg units are arranged in spaced parallel arrangement relative to a wall surface whereby each of the horizontally extending plank supporting brackets engage said wall surface and prop said scaffold leg units thereagainst.

7. In a scaffold device according to claim 1, wherein two spaced pairs of A-frame units are arranged with each pair being oppositely disposed with the horizontally extending plank supporting brackets in each pair being alined and abutting, and means for removably interconnecting the alined brackets in each pair whereby planks may span the brackets in each pair and provide a self-standing scaffold.

* * * * *